Nov. 18, 1969 V. E. SCANNELL 3,478,585
SAILING ACCESSORY
Filed June 12, 1967 2 Sheets-Sheet 1
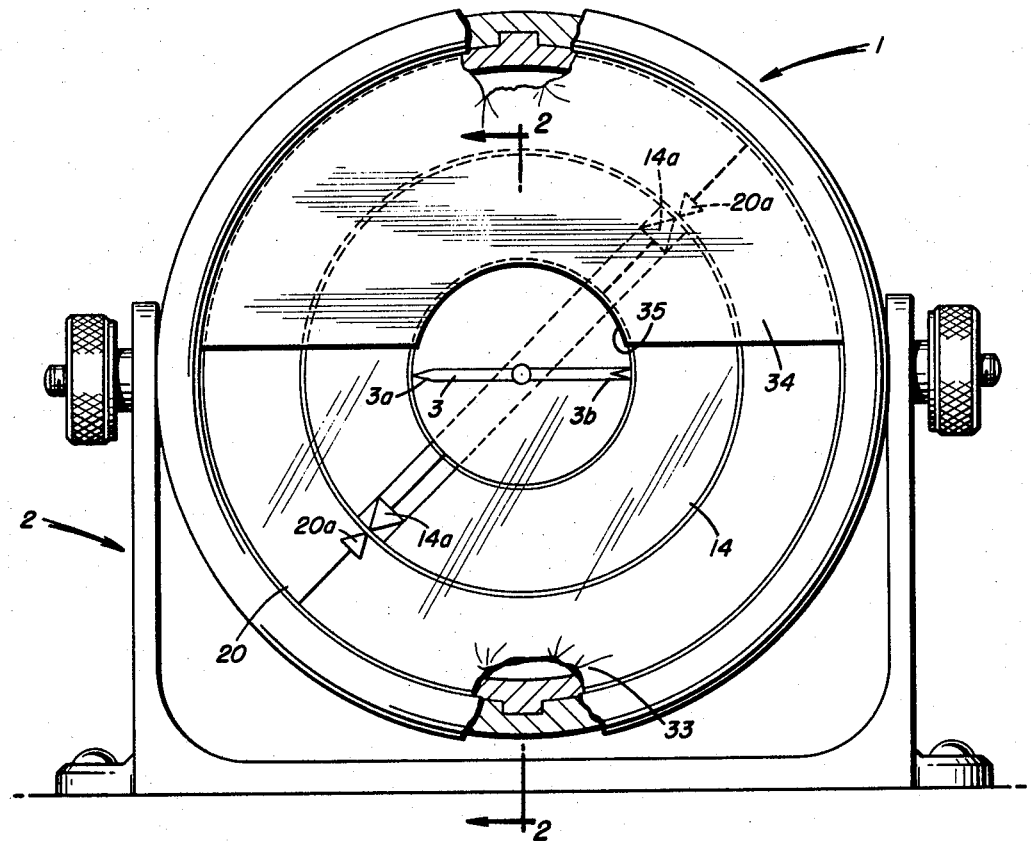
FIG. 1
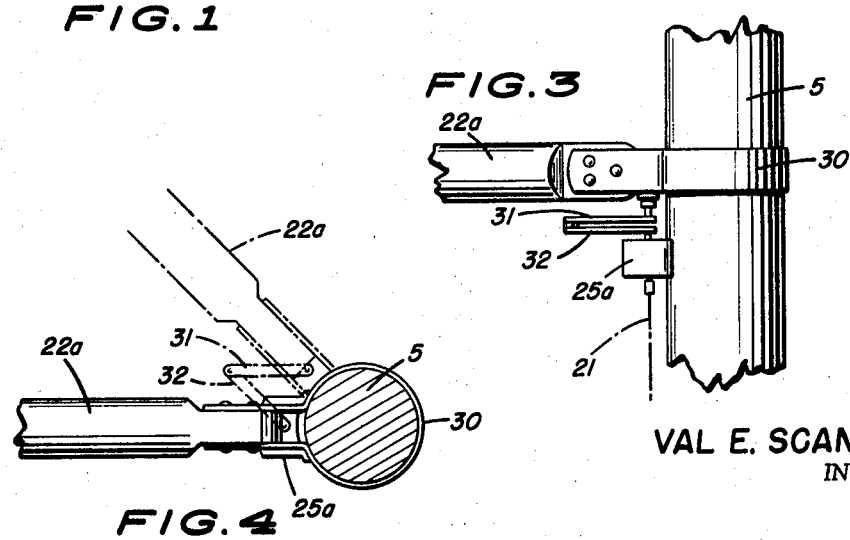
FIG. 3
FIG. 4
VAL E. SCANNELL
INVENTOR
BY
ATTORNEY Nov. 18, 1969  V. E. SCANNELL  3,478,585
SAILING ACCESSORY Filed June 12, 1967  2 Sheets-Sheet 2

VAL E. SCANNELL
INVENTOR

BY  *Emory L. Groff Jr.*
ATTORNEY

United States Patent Office 3,478,585
Patented Nov. 18, 1969

3,478,585
SAILING ACCESSORY
Val E. Scannell, 6218 Lone Oak Drive,
Bethesda, Md. 20034
Filed June 12, 1967, Ser. No. 645,123
Int. Cl. G01w 1/02
U.S. Cl. 73—188
9 Claims

ABSTRACT OF THE DISCLOSURE

An accessory for use by sailing skippers including wind and desirable boom position indicators, the latter indicator automatically set according to the apparent wind direction, and indicating means for signalling the actual current position of the boom.

---

This invention relates generally to a sailing accessory and more particularly to an apparatus of aid to a skipper of a sailing vessel and adapted to visually present an indication of the apparent wind direction or angle, while at the same time indicating the most desirable setting for the boom and also indicating the actual present setting of the boom. This desirable setting for the boom will be that setting determined to be most efficient based on a flat sail. The present invention will be found to be extremely accurate when used under the majority of wind conditions and will only occasionally require a small amount of added interpretation by the skipper based upon his experience, such as when there is a strong wind on the beam causing excessive heel.

Devices are known for visually presenting before the yachtsman the apparent wind direction with respect to the course of the vessel; however, use of such a device by itself leaves much in the nature of judgment to the experience of the skipper insofar as the proper setting of the sail in order to achieve the most desirable trim of the sail with respect to the component of the wind pressure most likely to enable one to secure the maximum forward propelling thrust.

By the present invention an accessory is provided by which the apparent wind direction is constantly presented by a visual indicator before the skipper while automatically presented in conjunction with the wind direction indicator are means indicating the most desirable position of the boom or set of the sail in order to most efficiently utilize the resultant wind component as presently available. Additional means are also proposed for indicating to the skipper that actual position of the boom as it is presently sheeted.

Accordingly, one of the primary objects of the present invention is to provide a sailing accessory including a combined visual indicator having means displaying the current wind direction with respect to the course of the vessel together with means indicating the present position of the boom in relation to said course.

Another object of the present invention is to provide a sailing accessory including a housing in close proximity to the skipper and having means therein visually indicating the direction of the wind and the position of the boom, both of which indicators are remotely controlled by actuating means situated on the mast and boom of the vessel, respectively.

Still another object of the present invention is to provide a sailing accessory for visually indicating to the skipper the direction of the wind relative to the course of the vessel and also indicating the most desirable setting for the boom in order to utilize the driving force of the wind most effectively.

With these and other objects in view which will more readily appear as the nature of the invention is better understood, the invention consists in the novel construction, combination, and arrangement of parts hereinafter more fully described and illustrated.

A preferred and practical embodiment of the invention is shown in the accompanying drawings in which:

FIGURE 1 is a front elevation, with portions broken away, of the indicator housing of the present invention.

FIGURE 3 is a fragmentary side elevation of one form of attachment of a boom to a mast and including the actuating means for controlling the boom indicator shown in FIGURES 1 and 2.

FIGURE 4 is a fragmentary top view, partly in section, disclosing alternate positions of a boom and the actuating means associated therewith as shown in FIGURE 3.

Similar reference characters designate corresponding parts throughout the several views of the drawings.

Figure 2:
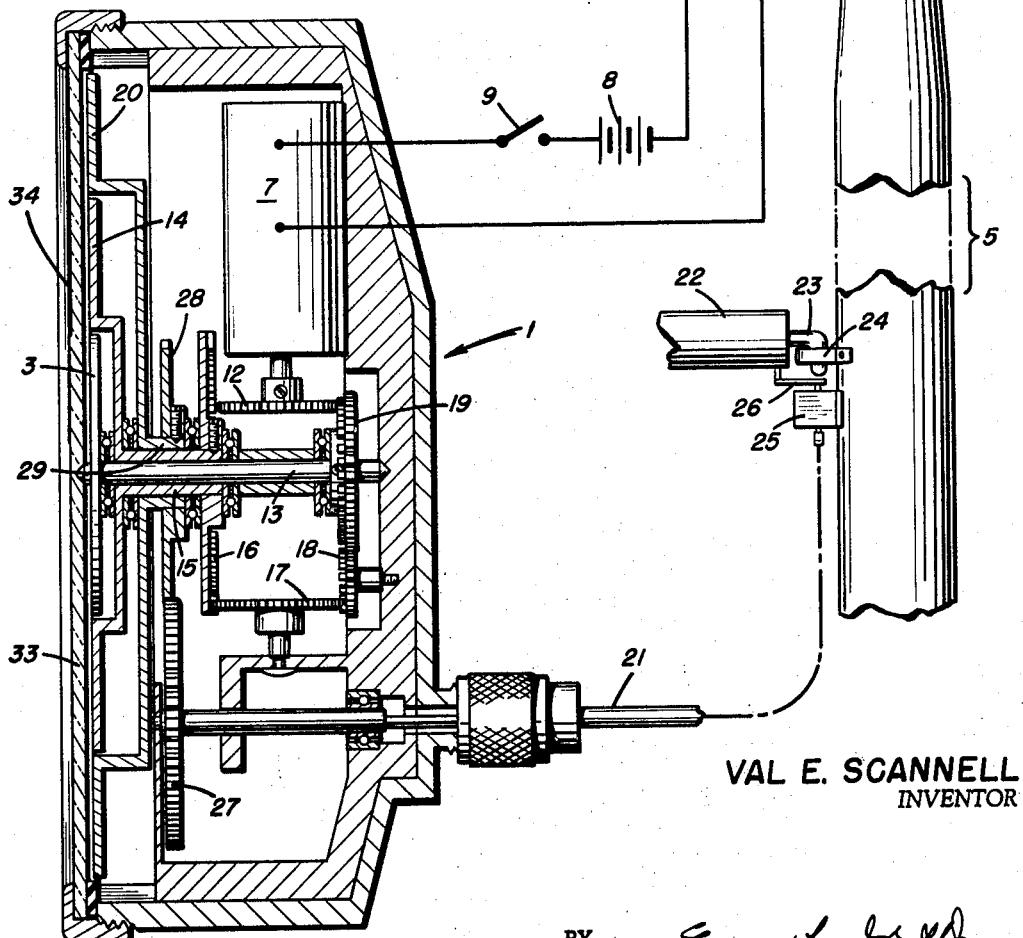
FIGURE 2 is a combined vertical sectional and side elevation view with portions broken away illustrating the interior of the indicator housing and the actuating means for remotely controlling the positions of the various indicators contained in the housing.

Referring now to the drawings, particularly FIGURES 1 and 2, it will be seen that the present invention comprises an indicator housing, generally designated 1, adapted to be fixedly positioned in close proximity to the skipper of a sailing vessel by means of the mounting bracket 2. Three different rotary indicators are included within the indicator housing 1. The first, a wind direction indicator 3 is remotely controlled by means of a wind vane 4 preferably mounted atop the mast 5. Although any suitable means may be utilized to transmit changes in the position of the wind vane 4 to the wind direction indicator 3 within the housing 1, a servomechanism has been found to be the most appropriate. As will be seen in FIGURE 2 the wind vane 4 is directly linked to a selsyn generator or transmitter 6 which is electrically connected to a synchronous or slave motor 7 situated within the indicator housing 1. A suitable power supply 8 and switch means 9 are included within the electrical circuitry for providing current and control means for activating the servomechanism. To enhance the responsiveness and accuracy of the wind indicating system, the wind vane 4 and its associated selsyn generator 6 are preferably supported in gimbal fashion between the uprights of a standard 10 mounted atop the mast 5. By the inclusion of a suitable counterweight 11 at the bottom of the selsyn generator 6 it will be seen that the accuracy of the operation of the wind vane signal transmitting system will be least affected by the heeling of the boat.

From the foregoing it will be understood that as the wind angle changes with respect to the course heading of the vessel, the vane 4 will be displaced accordingly thereby causing the selsyn generator 6 to transmit a signal to the slave or synchro motor 7 which, in turn, will cause rotation of the synchro output shaft and drive gear 12. Any suitable arrangement of mechanical motion transmitting means such as the plurality of gears as shown in FIGURE 2, may be utilized to transmit movement of the drive gear 12 as a rotational movement of the wind direction indicator needle 3 which is mounted upon the wind direction indicator shaft 13, in turn suitably journaled within the housing 1.

Actuation of the synchro motor 7 by means of the selsyn generator 6 not only causes rotary movement of the wind direction indicator needle 3 but also at the same time provides for the rotary displacement of the desirable boom position indicator 14. This indicator 14 is supported by means of the desirable boom position indicator mounting sleeve 15 loosely journaled about the wind direction indicator shaft 13 and connected by means of the differential gears 16, 17, and 18 to the same drive gear 19 which controls the position of the wind direction indicator needle 3. The size of the various gears 16, 17, and 18 are selected so that rotational displacement of the wind direction indicator 3 will be reflected by a displacement exactly one-half as great in the position of the desirable boom position indicator 14.

A typical situation is illustrated in FIGURE 1. In this figure the wind direction indicator needle 3 discloses an apparent wind abeam, or at 90° to the couse heading of the vessel, while the position of the desirable boom position indicator needle 14 is one-half of the amount of the needle 3, or at a setting of 45° with respect to the wind indicator 3. The indicator 14 thus displays to the skipper the position at which the boom should be sheeted in order to achieve the most desirable relative positioning of the sail with respect to the course of the vessel and the apparent direction of the wind.

With the foregoing information presented to him the skipper would still have to rely upon his personal experience in order to exactly set the sail to the position indicated by the indicator needle 14. Accordingly, the sailing accessory of the present invention includes an additional visual indicator in the form of an actual boom position indicator 20 which, as shown in FIGURE 2, is mechanically actuated by means of a cable drive 21 leading from the indicator housing 1 to the vicinity of the connecting point between the end of the boom 22 and the mast 5.

In the boom attachment arrangement shown in FIGURE 2 a pivot member 23 is journaled within a fitting 24 fixably attached to one side of the mast 5. The actuating means for the cable drive 21 comprises a gear box 25 attached to the mast and which is controlled upon lateral displacement of the boom 22 by movement of a crank arm 26 connected at one end to the end of the boom and at the other end to the gear box 25. With this arrangement, it will be seen that pivotal movement of the boom 22 results in a corresponding transverse displacement of the crank arm 26 and the subsequent actuation of motion transmitting means within the box 25 to rotate the cable drive 21, which is conneced at its other end, to suitable gearing 27 and 28 in engagement with the hub 29 supporting the actual boom position indicator 20.

An alternate form of actuating means for the actual boom position indicator 20 is shown in FIGURES 3 and 4 wherein the boom of the vessel is attached to the mast 5 by means of a collar fitting 30 adapted to move about the mast as the position of the boom 22a is altered. The actuating means shown in FIGURE 2 cannot be used with the arrangement of FIGURES 3 and 4 inasmuch as this latter arrangement has the boom pivot point coinciding with the center of the mast 5. Thus, it is necessary to provide a compensating linkage system in this form of boom attachment to ensure the transmission of a unit displacement of the boom 22a as an exact corresponding displacement within the gear box 25a and cable drive 21. In this respect a pair of pivoted links 31 and 32 are provided so that a parallelogram type arrangement will at all times be present as the boom 22a is displaced, as shown in FIGURE 4.

The three indicators, 3, 14, and 20, as viewed by the skipper, present a planar arrangement at the face of the housing 1. As will be seen in FIGURE 1, the flat disc forming the wind direction indicator 3 is disposed in the axial center of the housing and includes indicia in the form of a needle having a point 3a immediately adjacent the periphery of the disc and a tail 3b disposed diametrically from the point 3a. Concentrically disposed about the wind direction indicator 3 is the desirable boom position indicator 14 having diametrically opposed indicia 14a—14a at the periphery thereof. Concentrically disposed in turn about the desirable boom position indicator 14 is the actual boom position indicator 20 having a pair of indicia 20a—20a also diametrically opposed from one another and extending radially to a point at least immediately adjacent the inner periphery of the indicator 20. Overlying all of the indicators is a transparent window 33 which is provided with a screen or shield 34 of opaque material covering a substantial portion of the upper one-half of the window 33, whereby the lower edge 35 of which will be seen to comprise a horizontal line disposed immediately above the center axis of the assembly of three indicators.

By the above arrangement only one of the pointers 14a and 20a will normally be visible behind the window 33 while the diametrically opposite points 14a and 20a will be hidden from view behind the opaque shield 34 as shown in FIGURE 1. Although peripheral indicia may be provided on any one or all of the three indicators, such as degree marks, this would usually be of little assistance to the skipper since the operation of the present invention is based entirely upon the relative position of the wind direction indicator 3 with respect to the actual course heading of the vessel. Some form of marking may be provided on either the window 33 or adjacent face of the housing 1 in the area immediately beneath the horizontal edge 35 of the opaque shield 34 for the purpose of indicating to the skipper the position at which the mast guys are located in order to serve as a signal to prevent sheeting of the boom beyond the point of such markings as would be indicated by the position of the actual boom position indicator 20.

I claim:

1. An accessory for use on a sailing vessel having a mast and boom comprising, a housing including a plurality of movable indicators, means on said vessel detecting the apparent wind direction, means connecting said detecting means to a first one of said movable indicators and including means responsive to changes in the apparent wind direction to angularly displace said first one of said indicators to visually indicate the wind direction relative to the vessel heading, differential drive means in said housing connecting said first one of said indicators to another one of said movable indicators, said drive means angularly displacing said another one of said indicators an amount substantially one-half the angular displacement of said first one of said indicators, and actuating means connecting the boom to still another one of said indicators and responsive to movement of the boom to angularly displace said still another one of said indicators to visually indicate the actual present position of the boom, whereby said another one of said indicators visually indicates the most desirable position to which the boom should be set to achieve the optimum performance of the vessel with respect to the instant apparent wind direction while said still another one of said indicators continuously indicates the actual present position of the boom.

2. An accessory according to claim 1, wherein said first one of said movable indicators is driven by a synchronous electrical motor and said wind detecting means includes a synchronous electrical generator adapted to activate said motor as said generator is excited by changes in the apparent wind direction.

3. An accessory according to claim 1, wherein said wind detecting means includes a wind vane and counterweight, said vane and counterweight supported by a gimbal standard mounted atop said mast.

4. An accessory according to claim 1, wherein said indicators include circular members having concentrically disposed co-planar surfaces each of which is provided with radially extending indicia.

5. An accessory according to claim 4, wherein said housing includes a window overlying said indicator co-planar surfaces, and an opaque shield overlying the upper portions of said surfaces, the lower edge of said shield presenting a horizontal reference line immediately above the center of said concentrically disposed surfaces.

6. An accessory according to claim 1, wherein said actuating means includes crank means connected on the one hand to said boom and on the other hand to gear means in a housing which is fixedly attached to said mast, and flexible drive means connecting said housing on said mast to said still another one of said movable indicators.

7. An accessory according to claim 6, wherein said crank means includes a single crank arm and said boom is pivotally attached to a fitting anchored to said mast.

8. An accessory to according to claim 6, wherein said crank means includes a pair of pivoted links and said boom is attached to said mast by means of a collar slidably position thereabout.

9. An accessory for use on a sailing vessel having a mast and boom comprising, a housing including a plurality of movable indicators, means on said vessel detecting the apparent wind direction, means connecting said detecting means to a first one of said movable indicators and including means responsive to changes in the apparent wind direction to angularly displace said first one of said indicators to visually indicate the wind direction relative to the vessel heading, differential drive means in said housing connecting said first one of said indicators to another one of said movable indicators, said drive means angularly displacing said another one of said indicators an amount substantially one-half the angular displacement of said first one of said indicators, whereby said another one of said indicators visually indicates the most desirable position to which the boom should be set to achieve the optimum performance of the vessel with respect to the instant apparent wind direction.

References Cited

UNITED STATES PATENTS

| | | | |
|---|---|---|---|
| 2,027,613 | 1/1936 | Pierce | 114—102 X |
| 2,363,087 | 11/1944 | Salisbury | 73—188 |
| 2,835,220 | 5/1958 | Rardin. | |
| 3,104,547 | 9/1963 | Suits et al. | 73—181 |
| 3,157,148 | 11/1964 | Reed | 114—102 X |
| 3,310,017 | 3/1967 | Dyer | 114—102 X |
| 3,371,529 | 3/1968 | Tillman | 73—188 |

LOUIS R. PRINCE, Primary Examiner

D. M. YASICH, Assistant Examiner

U.S. Cl. X.R.

116—124